United States Patent
Jung et al.

(10) Patent No.: US 10,390,288 B2
(45) Date of Patent: Aug. 20, 2019

(54) D2D OPERATION METHOD PERFORMED BY TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 15/113,357

(22) PCT Filed: Jan. 30, 2015

(86) PCT No.: PCT/KR2015/001026
§ 371 (c)(1),
(2) Date: Jul. 21, 2016

(87) PCT Pub. No.: WO2015/115862
PCT Pub. Date: Aug. 6, 2015

(65) Prior Publication Data
US 2017/0006524 A1 Jan. 5, 2017

Related U.S. Application Data

(60) Provisional application No. 61/933,813, filed on Jan. 30, 2014, provisional application No. 61/935,705, filed on Feb. 4, 2014.

(51) Int. Cl.
*H04W 4/00* (2018.01)
*H04W 48/10* (2009.01)
(Continued)

(52) U.S. Cl.
CPC ........... *H04W 48/10* (2013.01); *H04L 67/303* (2013.01); *H04W 72/1215* (2013.01);
(Continued)

(58) Field of Classification Search
USPC ......................................... 370/312
See application file for complete search history.

(56) References Cited

U.S. PATENT DOCUMENTS

2013/0170398 A1* 7/2013 Kwon ............... H04W 8/005
370/255
2014/0056220 A1* 2/2014 Poitau ............... H04W 76/14
370/328
(Continued)

FOREIGN PATENT DOCUMENTS

CN 103002594 3/2013
KR 1020090089985 8/2009
(Continued)

OTHER PUBLICATIONS

Ericsson, "On Out of Coverage Definitions for D2D", 3GPP TSG RAN WG1 Meeting #75, R1-135809, Nov. 2013, 4 pages.
(Continued)

*Primary Examiner* — Farah Faroul
(74) *Attorney, Agent, or Firm* — Lee Hong Degerman Kang Waimey

(57) ABSTRACT

Provided are a device-to-device (D2D) operation method performed by a terminal in a wireless communication system and a terminal using the method. The method comprises: determining whether the terminal is located within network coverage; and transmitting information notifying a result of the determination to another terminal. Using this information, said another terminal can know whether the terminal is located within the network coverage and perform the D2D operation on the basis thereof.

6 Claims, 23 Drawing Sheets

(51) Int. Cl.
*H04L 29/08* (2006.01)
*H04W 72/12* (2009.01)
*H04W 76/14* (2018.01)
*H04W 48/12* (2009.01)
*H04W 88/06* (2009.01)
*H04W 88/16* (2009.01)

(52) U.S. Cl.
CPC ............ H04W 76/14 (2018.02); *H04W 48/12* (2013.01); *H04W 88/06* (2013.01); *H04W 88/16* (2013.01)

(56) References Cited

U.S. PATENT DOCUMENTS

| | | | | |
|---|---|---|---|---|
| 2014/0112194 A1* | 4/2014 | Novlan | ................ | H04W 48/16 370/254 |
| 2014/0256262 A1* | 9/2014 | Park | ................... | H04L 63/0407 455/41.2 |
| 2014/0269464 A1* | 9/2014 | Park | ..................... | H04W 48/16 370/311 |
| 2014/0302784 A1* | 10/2014 | Kim | ..................... | H04W 8/005 455/41.2 |
| 2014/0307642 A1* | 10/2014 | Wanstedt | ............ | H04W 76/023 370/329 |
| 2014/0328329 A1* | 11/2014 | Novlan | ............... | H04W 72/042 370/336 |
| 2015/0038136 A1* | 2/2015 | Wu | ........................ | H04W 48/08 455/434 |
| 2015/0117309 A1* | 4/2015 | Gage | ..................... | H04W 8/005 370/328 |
| 2015/0319724 A1* | 11/2015 | Chae | .................... | H04W 8/005 370/315 |
| 2016/0242152 A1* | 8/2016 | Yu | ......................... | H04W 8/005 |
| 2016/0270030 A1* | 9/2016 | Yu | ....................... | H04W 72/005 |

FOREIGN PATENT DOCUMENTS

| | | |
|---|---|---|
| WO | 2013025040 A2 | 2/2013 |
| WO | 2013025057 A2 | 2/2013 |
| WO | 2013062351 A1 | 5/2013 |
| WO | 2013077684 A1 | 5/2013 |
| WO | 2013115567 A1 | 8/2013 |

OTHER PUBLICATIONS

Qualcomm, "Overview of D2D and RAN1 and RAN2 status", 3GPP TSG RAN WG4 Meeting #68bis, R4-135540, Oct. 2013, 8 pages.

LG Electronics, "D2D Communication Signal Format", 3GPP TSG RAN WG1 Meeting #74bis, R1-134800, Oct. 2013, 9 pages.

* cited by examiner

D2D OPERATION METHOD PERFORMED BY TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2015/001026, filed on Jan. 30, 2015, which claims the benefit of U.S. Provisional Application Nos. 61/933,813, filed on Jan. 30, 2014 and 61/935,705, filed on Feb. 4, 2014, the contents of which are all hereby incorporated by reference herein in their entirety.

BACKGROUND OF THE INVENTION

Field of the Invention

The present invention relates to wireless communications, and more particularly, to a method for a device-to-device (D2D) operation performed by a terminal in a wireless communication system, and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, a terminal may perform a D2D operation using a D2D configuration provided from a network within coverage of the network. However, the terminal or another terminal may be moved beyond the network coverage.

In this case, there is a problem how to continuously perform the D2D operation without loss of the D2D operation. Further, in order to support the D2D operation without loss, there is a problem which signaling is performed by the terminal or another terminal.

SUMMARY OF THE INVENTION

The present invention provides a D2D operation method performed by a terminal in a wireless communication system and a terminal using the same.

In one aspect, provided is a device-to-device (D2D) operation method performed by a terminal in a wireless communication system. The D2D operation method includes determining whether the terminal is located within network coverage and transmitting information notifying a result of the determination to another terminal.

In another aspect, provided is a terminal for performing a D2D operation in a wireless communication system. The terminal includes a RF unit configured to send and receive radio signals and a processor connected to the RF unit to be operated. The processor determines whether the terminal is located within network coverage and transmits information notifying a result of the determination to another terminal.

According to the present invention, a D2D operation between terminals located inside and outside based on network coverage as a boundary may be performed. In addition, interference occurrence in a D2D operation between terminals included in different groups may be reduced.

DESCRIPTION OF EXEMPLARY EMBODIMENTS

Figure 1:
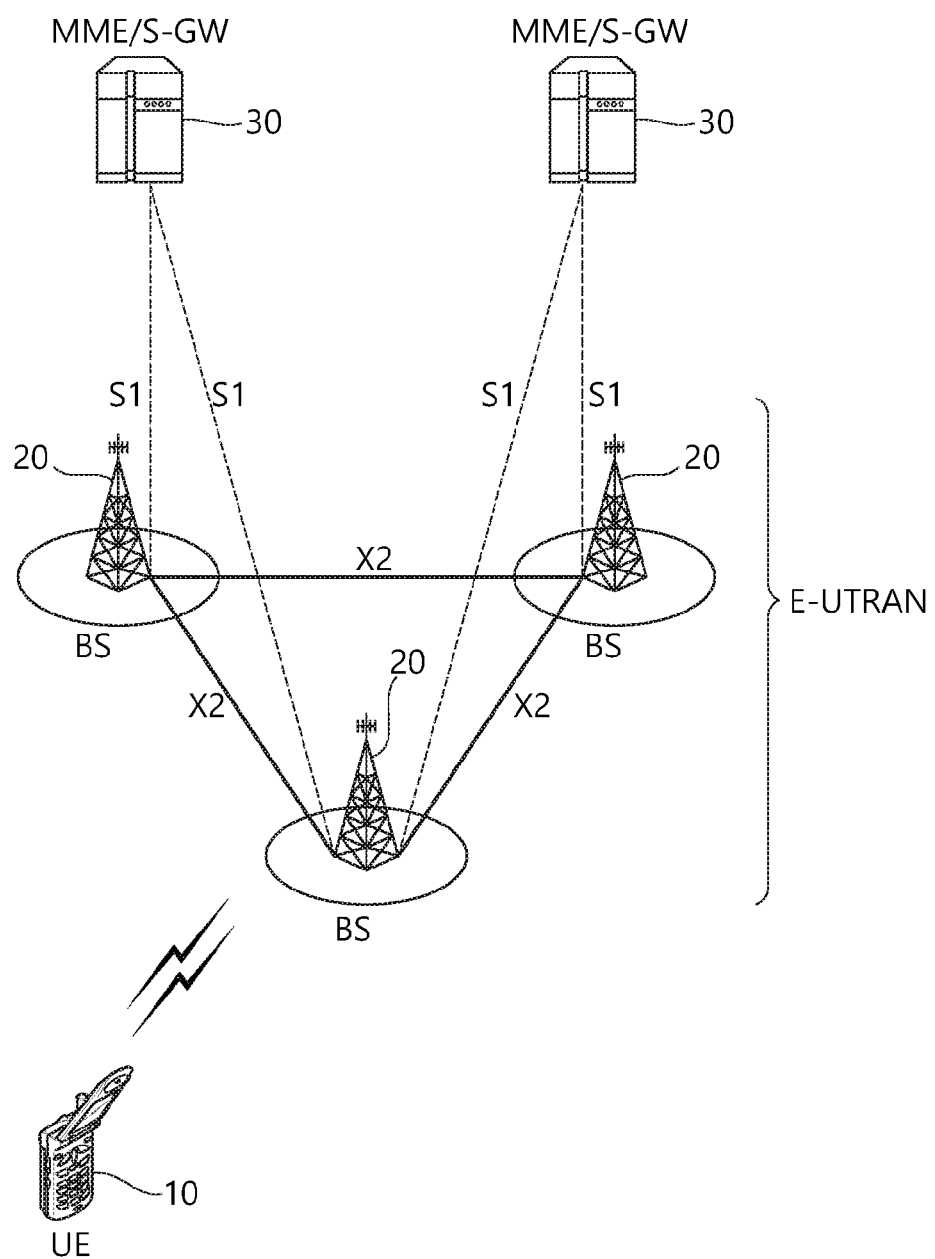
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
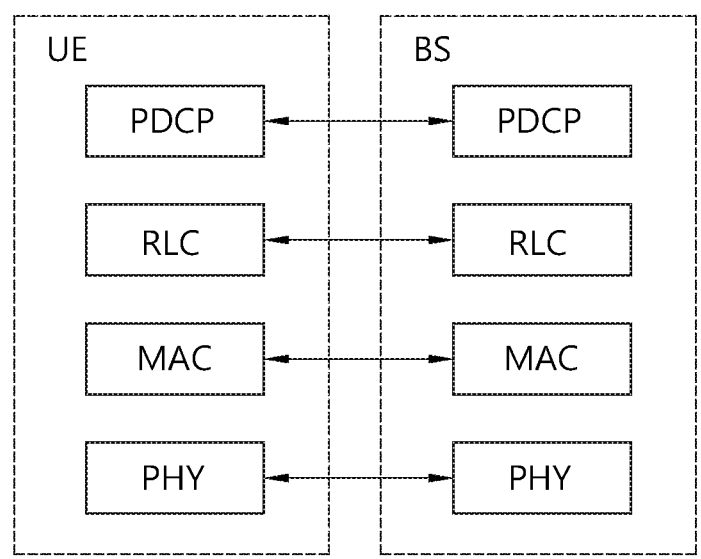
FIG. 2 is a diagram showing a wireless protocol architecture for a user plane.
Figure 3:
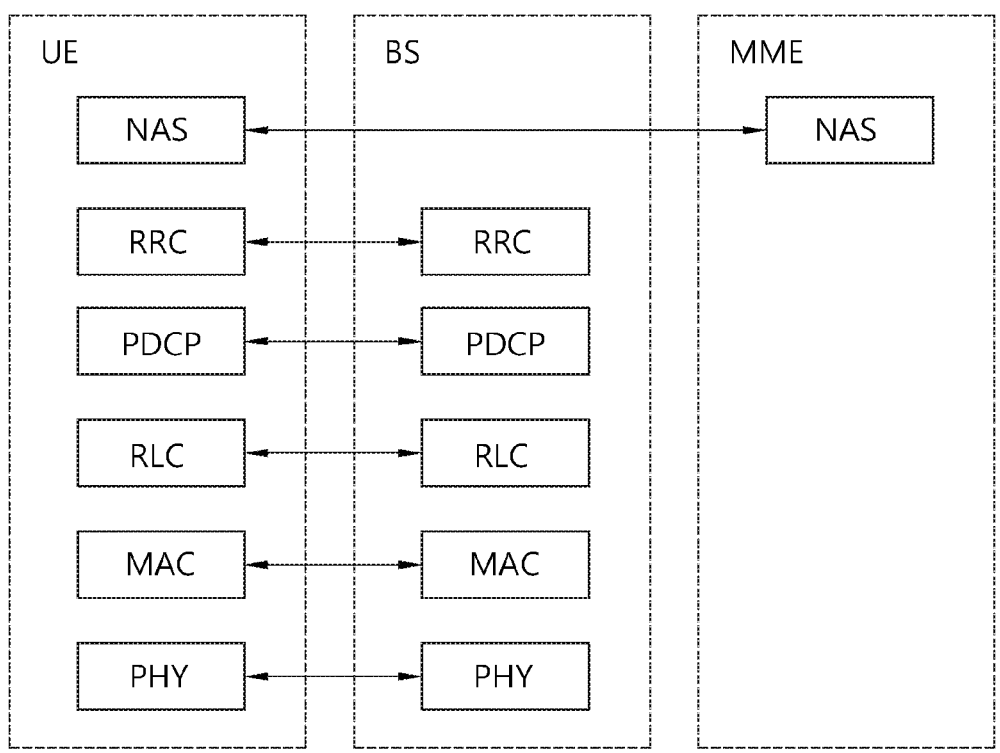
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
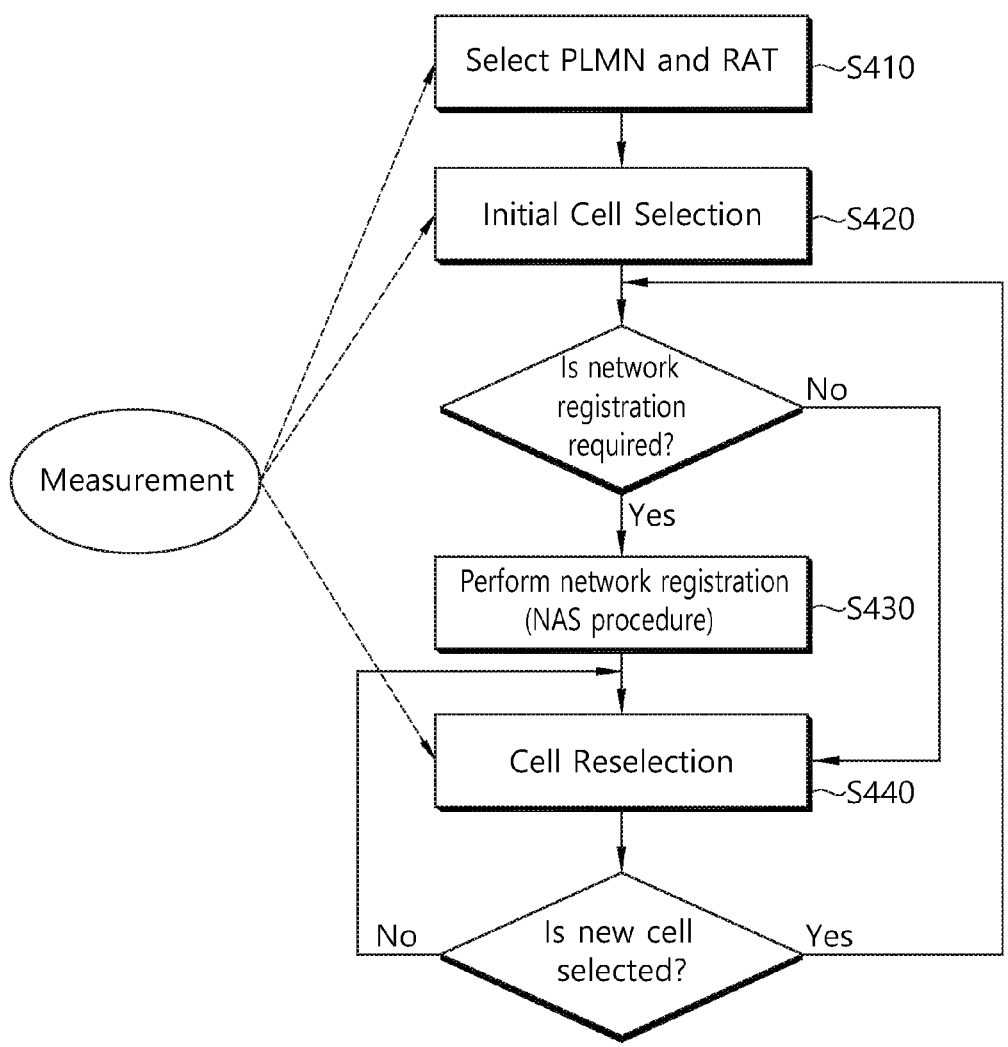
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
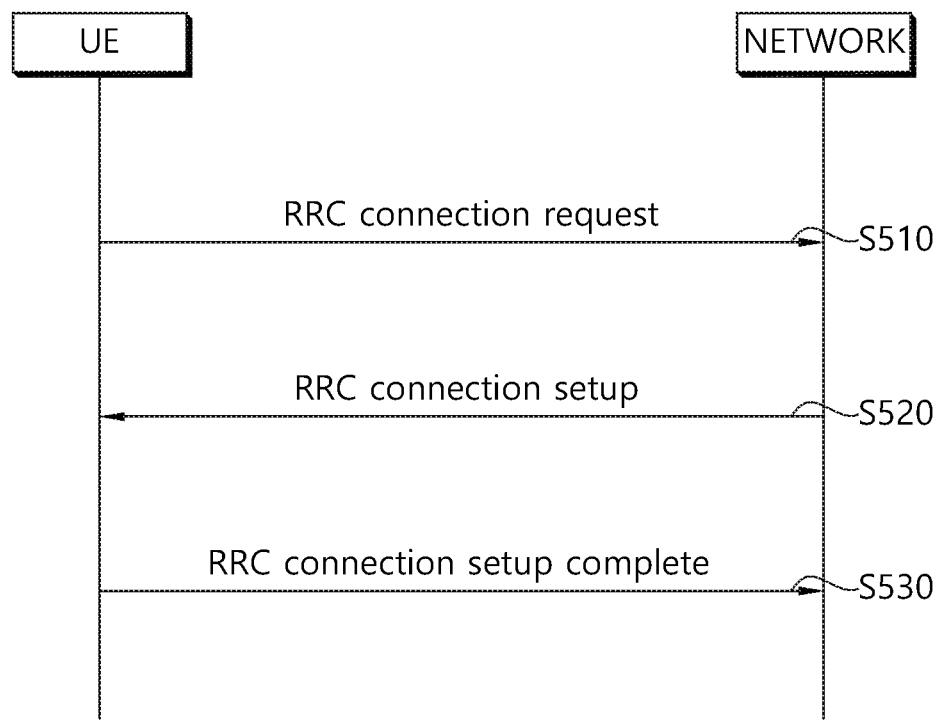
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
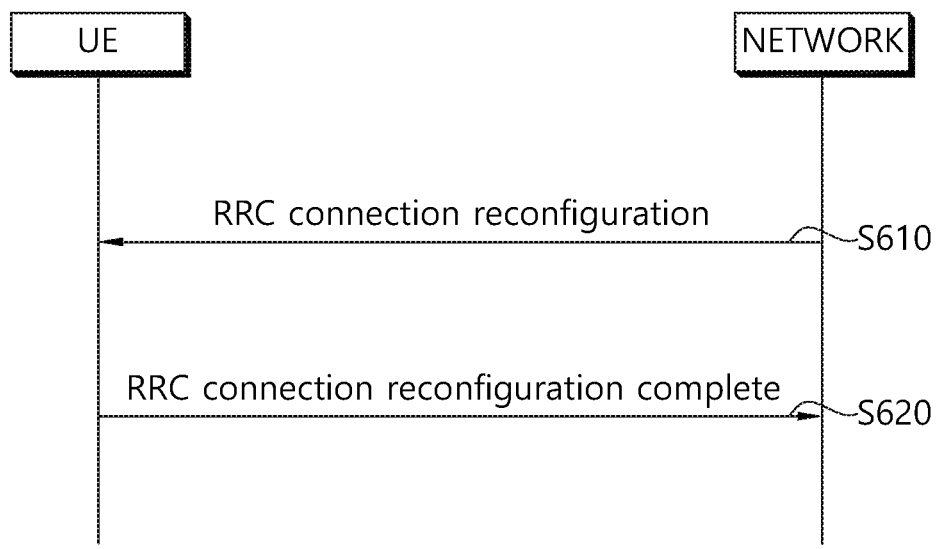
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (March 2009) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev > 0 \text{ AND } Squal > 0 \qquad \text{[Equation 1]}$$

where:
$Srxlev = Q_{rxlevmeas} - (Q_{rxlevmin} + Q_{rxlevminoffset}) - Pcompensation$
$Squal = Q_{qualmeas} - (Q_{qualmin} + Q_{qualminoffset})$ Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Qmeas,s + Qhyst,\ Rn = Qmeas,s - Qoffset \qquad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset= Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
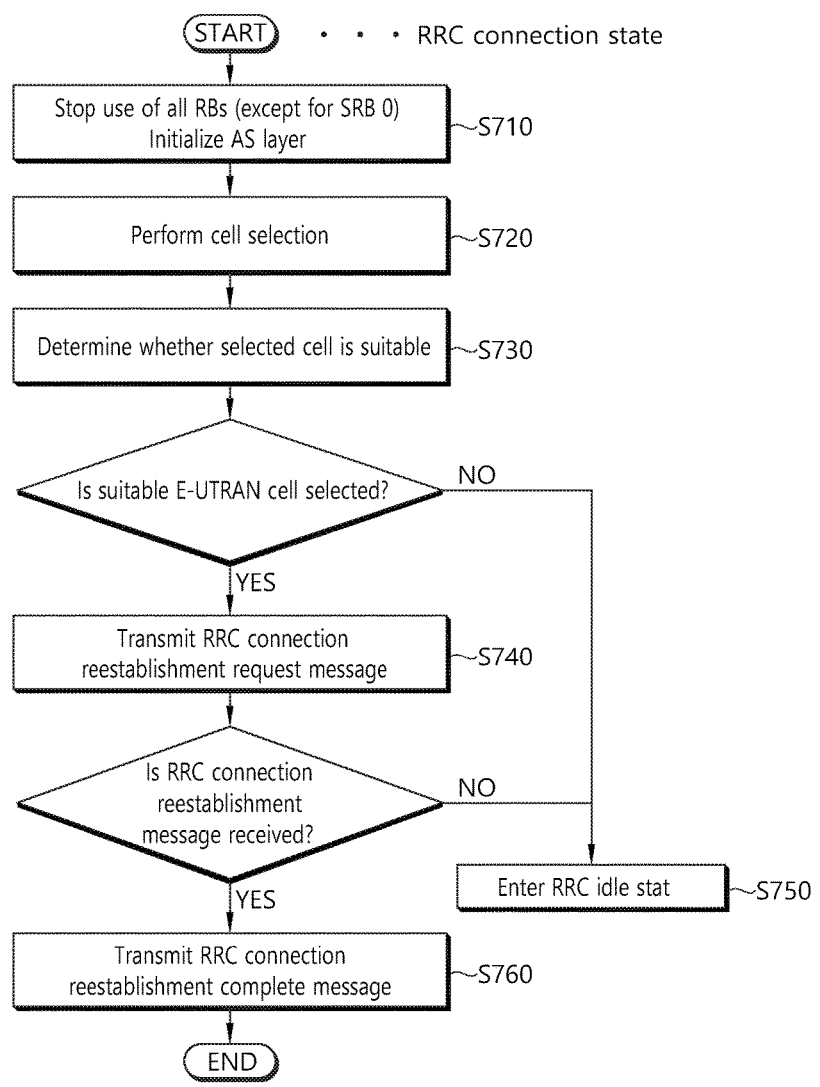
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
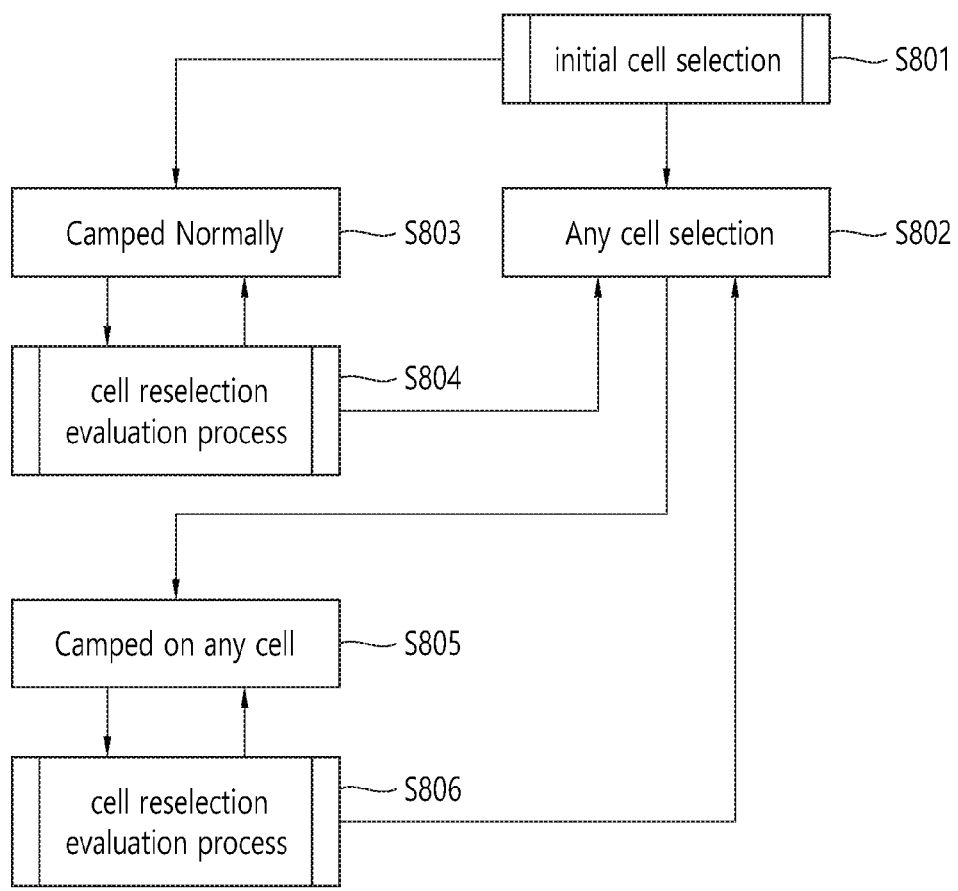
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
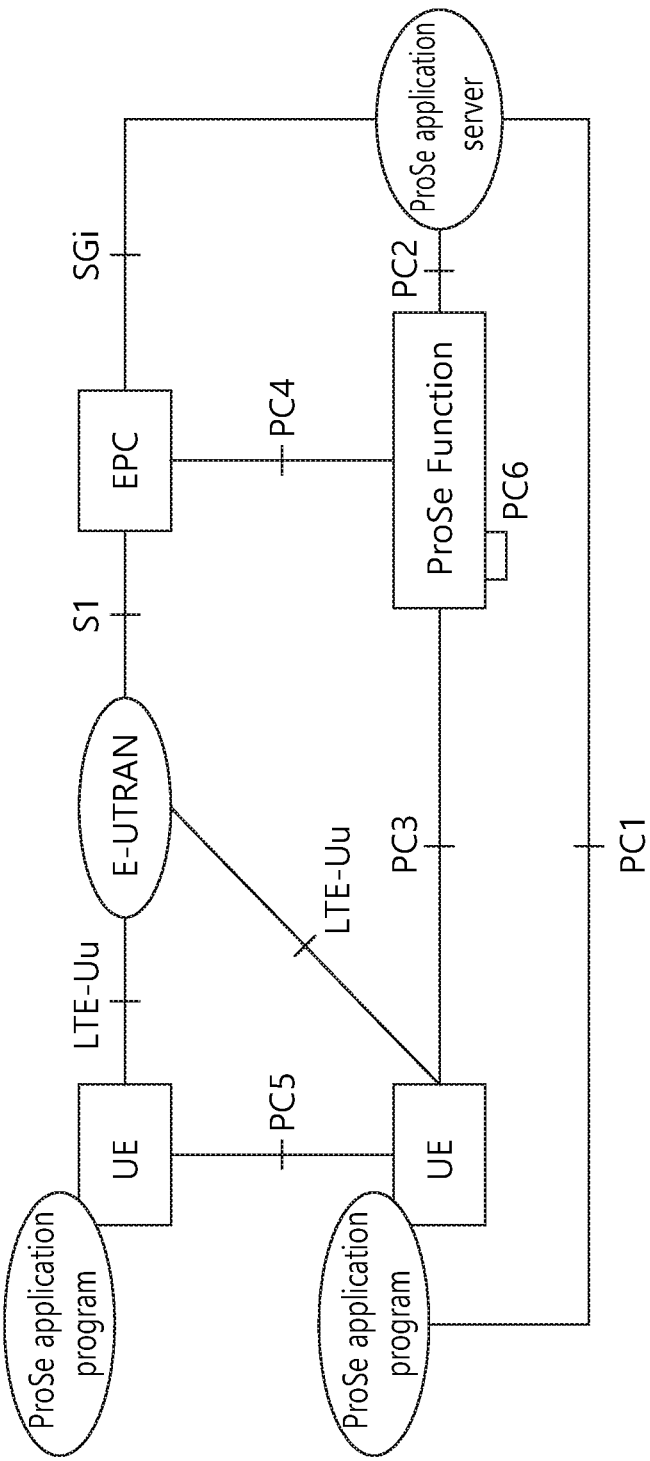
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
  PC5: a reference point used for using control/user plane for discovery and communication, relay, and 1:1 communication between types of UE.
  PC6: a reference point for using a function, such as ProSe discovery, between users belonging to different PLMNs.
  SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
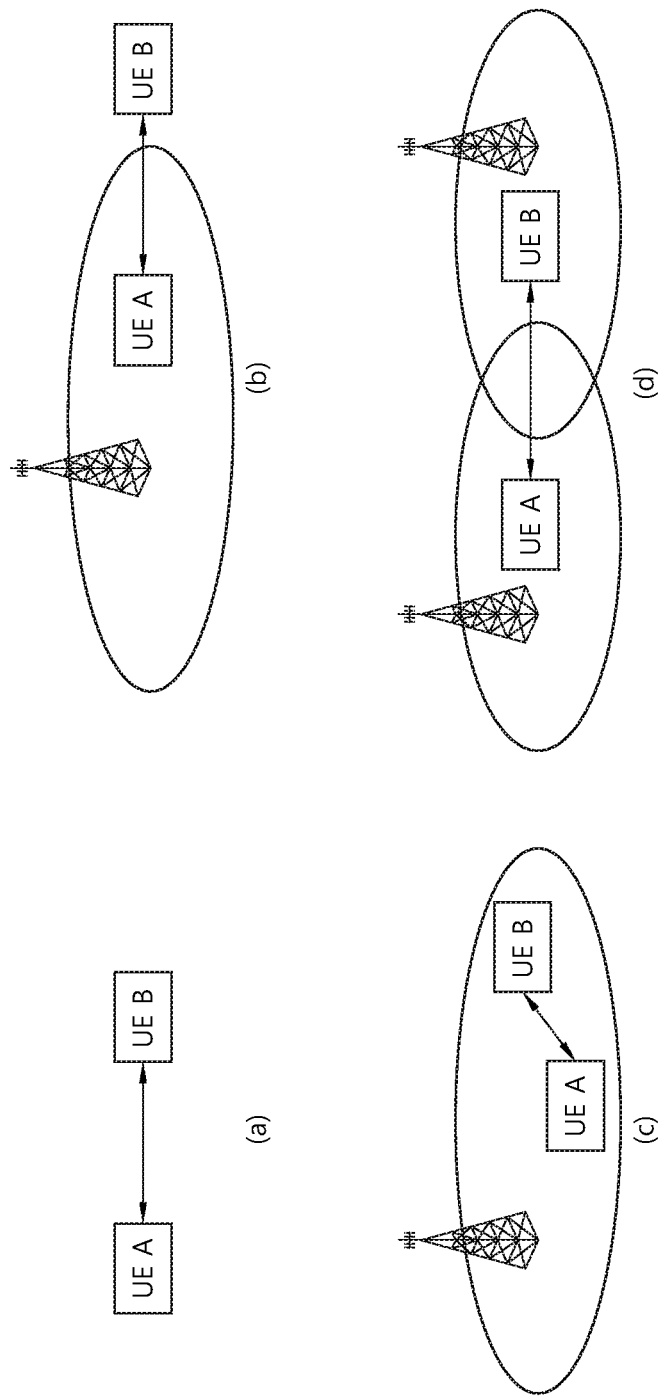
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
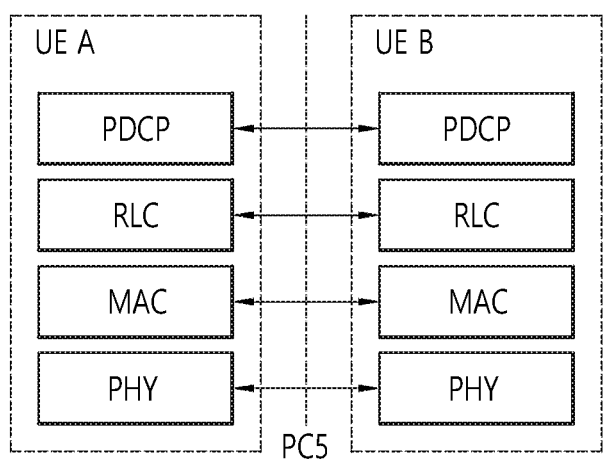
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
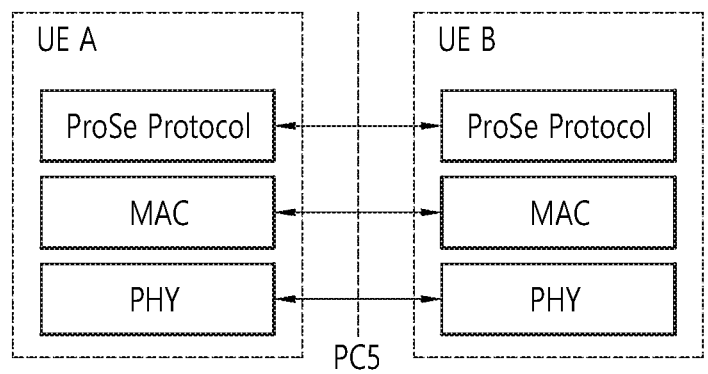
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
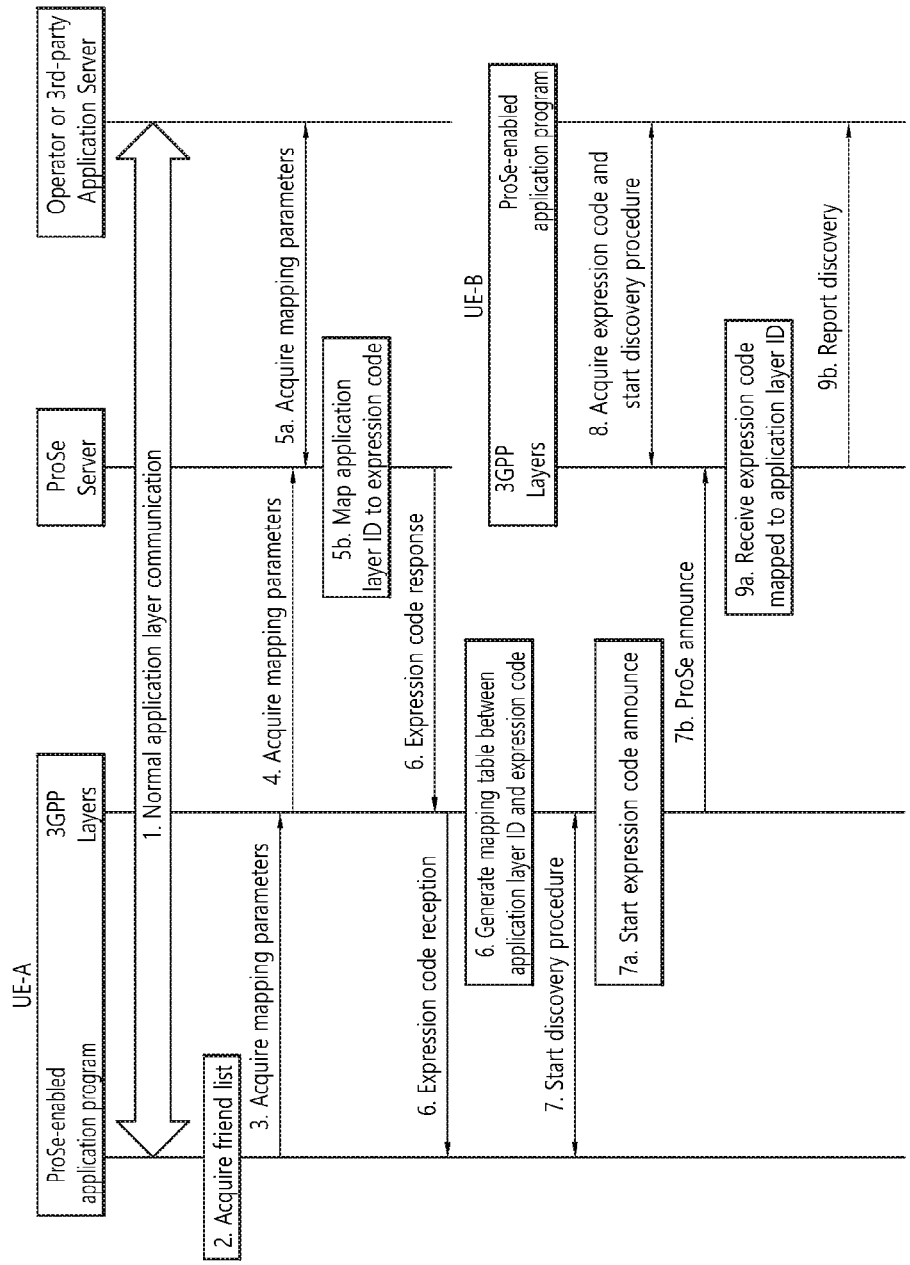
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ 67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2 FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
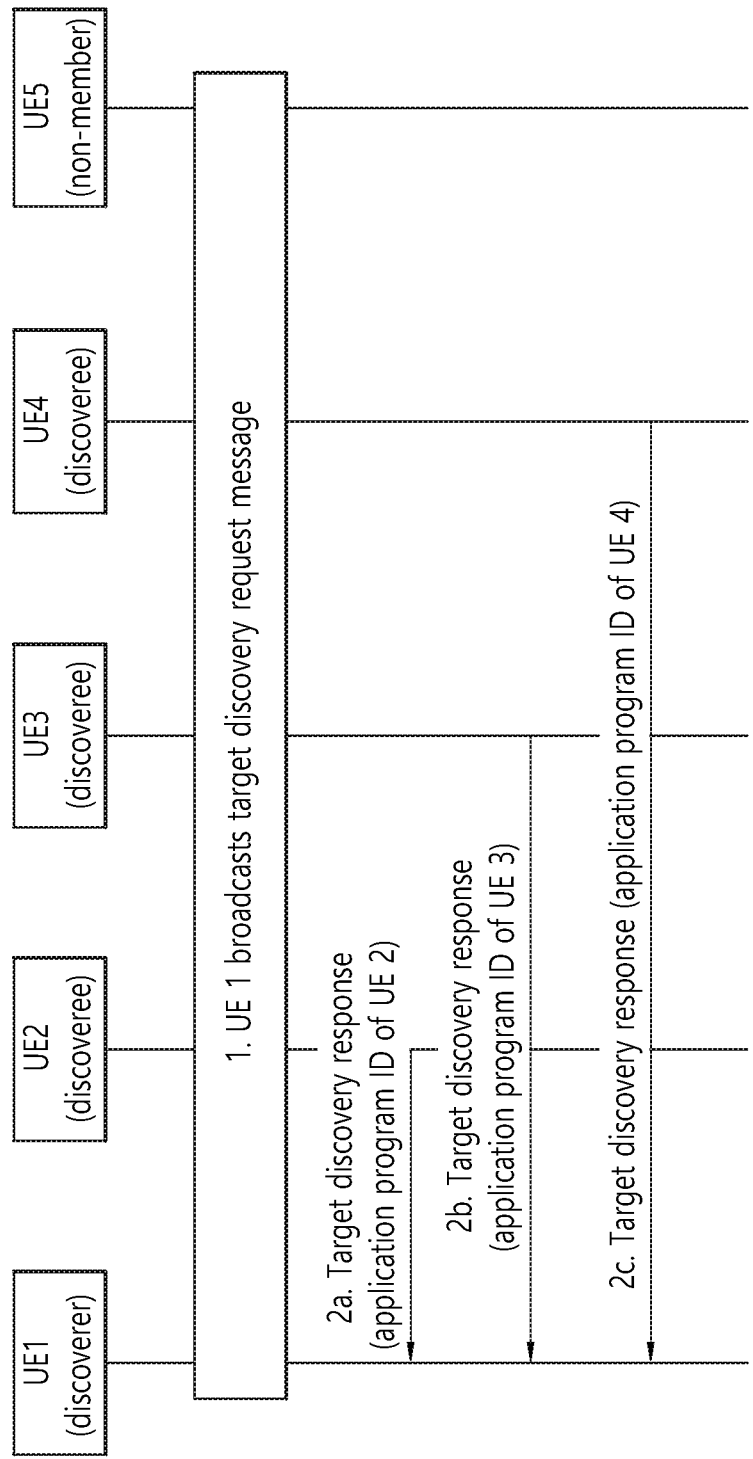
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2 -4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1 . The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1 ) sends a target discovery request message and receives a target discovery response message, that is, a response to the target discovery request message. Furthermore, when the discoveree (e.g., the UE 2 ) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

Meanwhile, a UE may provide a relay function or may discover a neighboring network node (refers to a relay node) which is previously provided. In this case, the network may not know presence of the relay node close to the terminal. In this case, the network may select an inefficient relay node. For example, although there is a relay node for providing a relay function around the terminal, the network may unnecessarily instruct the terminal to activate the relay function.

Further, if other terminals close to the terminal may identify presence of the relay node, it assists efficient communication in other terminals.

For example, it is assumed that UE 2 estimates communication delay with respect to a case of using UE 1 as a relay node. If the UE 2 may know that a network node close to the UE 1 provides a relay function to the UE 1 , since the UE 2 may know a fact that the UE 1 is a hop relay, the UE 2 may exactly estimate the communication delay.

In a following description, uplink means communication from the UE to a base station (network). The network node may represent the terminal, the base station, or both of them. A configuration may signify a rule which is determined by the network or is previously determined in the terminal.

In the present invention, the network node may provide the relay function for another network node. In this case, the network node may signal that the network provides the relay function. Further, the network node may signal to use a specific resource allowed for only the relay function. As described above, the network may be a terminal. The UE providing the relay function may be classified into a UE-NW relay and a UE-UE relay according to between which network nodes the relay function is provided.

Figure 15:
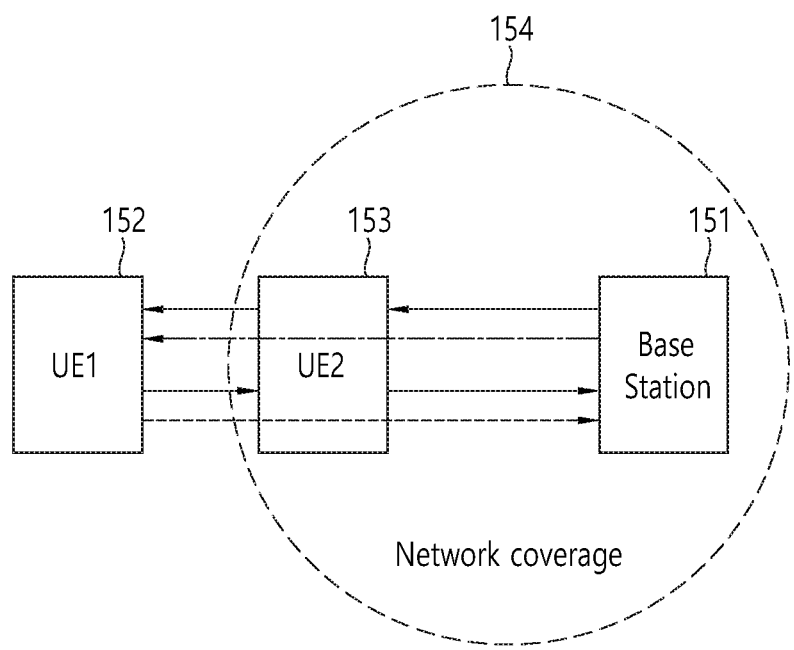
FIG. 15 illustrates a UE-NW relay.

FIG. 15 illustrates a UE-NW relay.

Referring to FIG. 15, a UE 2 153 serves as an UE-NW relay. That is, the UE 2 153 is a network node configured to relay between a UE 1 152 located outside coverage 154 of a network 151 and the network 151. In this case, the UE 2 153 may serve as an UE-NE relay.

In FIG. 15, since the UE 1 152 is located outside the network coverage, if the UE 2 153 does not provide a relay function, the UE 2 153 may not communicate with the network 151.

Figure 16:
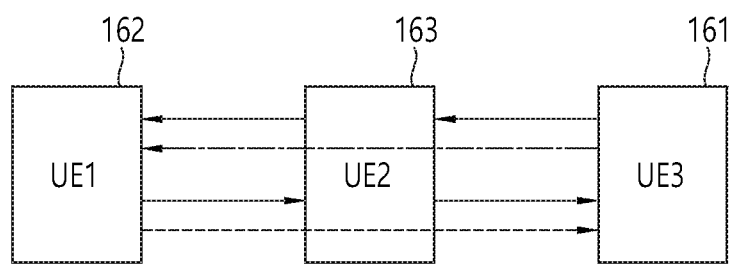
FIG. 16 illustrates a UE-UE relay.

FIG. 16 illustrates a UE-UE relay.

Referring to FIG. 16, a UE 2 163 serves as an UE-UE relay. That is, the UE 2 163 is a network node configured to relay between another UE 161 located outside coverage of a specific UE 162 and the specific UE 162. In this case, the UE 2 163 may serve as an UE-UE relay.

In FIG. 16, the UE 1 162 and the UE 3 161 are located outside coverage thereof to each other, if the UE 2 163 does not provide the relay function, the UE 1 162 may not communicate with the UE 3 161.

Hereinafter, the present invention will be described.

Figure 17:
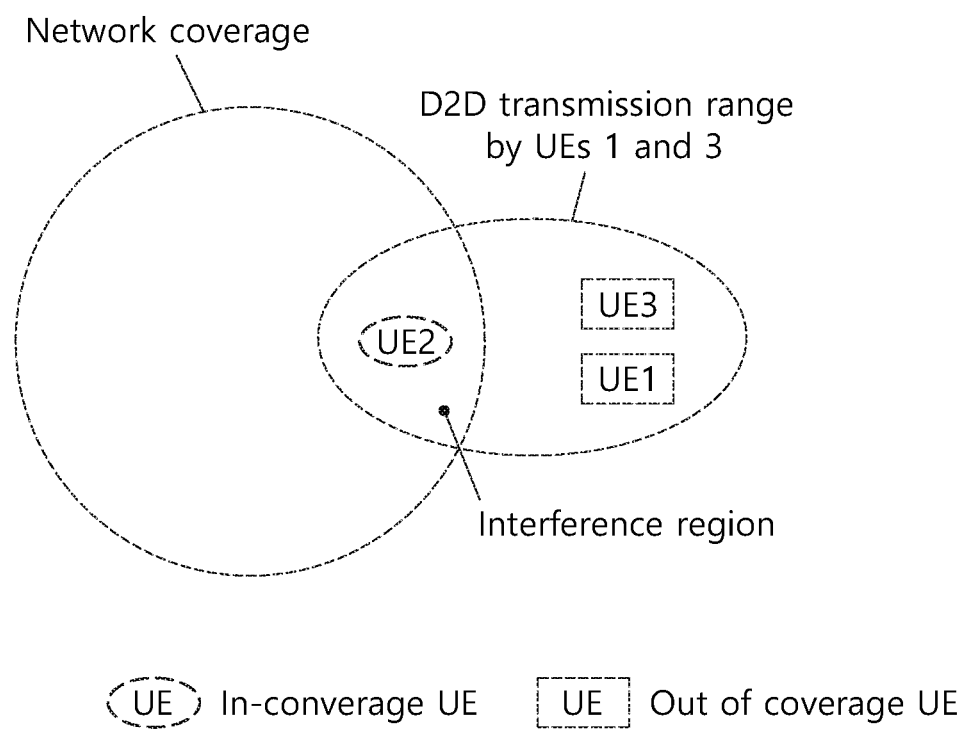
FIG. 17 illustrates network coverage and locations of terminals.

FIG. 17 illustrates network coverage and locations of terminals.

Referring to FIG. 17, it is assumed that UE 1, UE 2, and UE 3 are located with original network coverage and then are moved. As a moving result, it is assumed that current UE 1 and UE 3 are located outside the network coverage and a current UE 2 is located within the network coverage.

In this case, a transmission range of UE 1 (or UE 3 ) may partially overlap with the network coverage. Interference may be caused in the overlapped region so that the overlapped region refers to an interference region.

If the UE 1 and the UE 3 are detected to be beyond the network coverage, a configuration (e.g., a D2D configuration for a D2D operation) applied in the network coverage is revoked by itself and a configuration applied outside the network coverage may be invoked. A configuration applied outside the network coverage may be reported in the UE 1 and the UE 3 or stored, and may be a configuration for the D2D operation.

That is, if the UE is separated from the network coverage, the UE may replace a D2D configuration provided from the network with another D2D configuration. In this case, another D2D configuration may be a configuration which is previously provided to the UE.

Hereinafter, it is assumed that the first D2D configuration is a configuration for a D2D operation controlled by the network and the second D2D configuration is a configuration for the D2D operation previously reported or stored in the UE for convenience. The second D2D configuration may be previously provided/stored in a subscriber identification module (SIM) or a memory of the UE or may be fixed and known by networks.

The following illustrates an example of the first D2D configuration.

TABLE 2

```
-- ASN1START
System Information BlockType 18-r12 ::=SEQUENCE {
    commConfig-r12                              SEQUENCE {
        commRxPool-r12                              ProseCommPoolList16-r12,
        commTxPoolNormalCommon-r12                  ProseCommPoolList4-r12
        OPTIONAL,           -- Need OR
        commTxPoolExceptional-r12                   ProseCommPoolList4-r12
        OPTIONAL,           -- Need OR
        commSyncConfig-r12
        ProseSyncConfigList16-r12       OPTIONAL    -- Need OR
    }
                                                    OPTIONAL,  -- Need OR
    lateNonCritical Extension       OCTET STRING
        OPTIONAL,
    ...
}
-- ASN1STOP
```

The first D2D configuration of the table 2 represents a resource which may be used in ProSe direct communication. For example, in the table 2, the 'commRxPool' represents a resource that allows the UE to receive the ProSe direct communication. The 'commTxPoolNormalCommon' represents a resource allowed to transmit the ProSe direct communication in a RRC_Idle state. The 'commonTxPoolExceptional' represents a resource allowed to transmit the ProSe direct communication under an exceptional condition in a RRC_connected state or during an RRC connection establishment procedure.

The following illustrates another example of the first D2D configuration.

TABLE 3

```
-- ASN1START
SystemInformationBlockType19-r12 ::= SEQUENCE {
    discConfig-r12                              SEQUENCE {
        discRxPool-r12                              ProseDiscPoolList16-r12,
        discTxPoolCommon-r12                        ProseDiscPoolList4-r12
        OPTIONAL,           -- Need OR
        discTxPowerInfo-r12
        ProseDiscTxPowerInfoList-r12    OPTIONAL,   -- Need OR
        discSyncConfig-r12
        ProseSyncConfigList16-r12           OPTIONAL    -- Need OR
    }
                                                    OPTIONAL,  -- Need OR
    discInterFreqList-r12                           ProseCarrierFreqInfoList-r12
    OPTIONAL,               -- Need OR
    lateNonCritical Extension       OCTET STRING
        OPTIONAL,
    ...
}
ProseCarrierFreqInfoList-r12 ::=    SEQUENCE (SIZE (1..maxFreq)) OF ProseCarrierFreqInfo-r12
ProseCarrierFreqInfo-r12::=         CHOICE {
    plmn-Index-r9                                   INTEGER    (1..maxPLMN-
r11),
    explicitValue-r9                                SEQUENCE {
        carrierFreq-r12                                 ARFCN-ValueEUTRA-r9,
        plmn-Identity-r12                               PLMN-Identity
        OPTIONAL            -- Need OR
    }
}
-- ASN1STOP
```

Another example of a first D2D configuration in the table 3 indicates a resource which may be used in ProSe direct Discovery. For example, the 'discTxPoolCommon' indicates a resource that allows the UE to transmit a ProSe direct discovery announcement in an RRC_idle state. The 'discInterFreqList' indicates adjacent frequencies to which a ProSe direct discovery announcement is supported.

Accordingly, if the UE is detected to be inside the network coverage, the UE may express to use the first D2D configuration. If the UE is detected to be outside the network coverage, the UE may express to use a second D2D configuration. However, the operation of the UE may cause following problems.

1) Interference Between UE Groups

Figure 18:
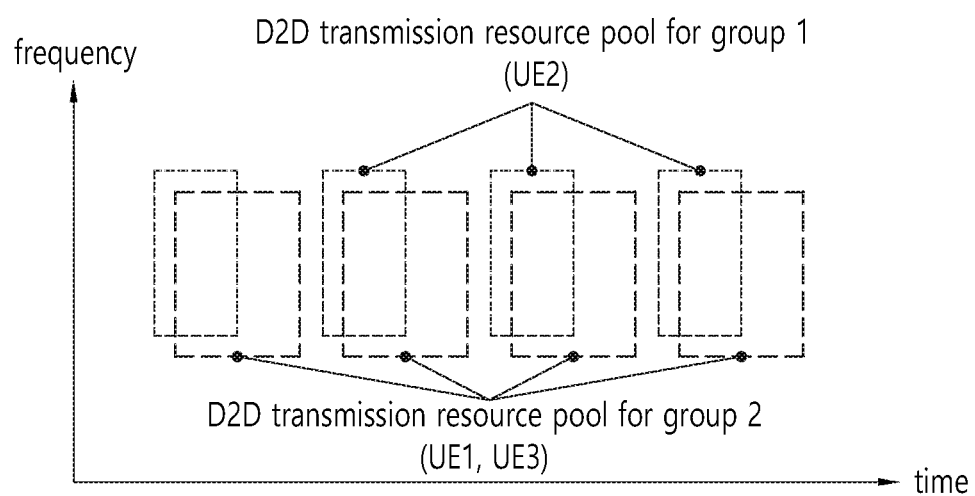
FIG. 18 illustrates an example of using different D2D resource pools between different UE groups.

FIG. 18 illustrates an example of using different D2D resource pools between different UE groups.

Referring to FIG. 18, a UE 2 may be included in a group 1, and UE 2 and 3 may be included in a group 2. In this case, resource pools used by a group 1 including the UE 1 may partially overlap with resource pools used by a group 2 including the UE 2 and the UE 3 without being fully separated from each other. The resource pools used by the group 1 may be a resource pool according to a first D2D configuration provided from a network, and the resource pools used by the group 2 may be a resource pool according to a preset second D2D configuration.

It is assumed that the UE 1 and the UE 3 are include in the same group and communicate with each other. Further, it is assumed that the UE 2 is included in another group. Moreover, it is assumed that a second D2D configuration is applied the UE if a first D2D configuration is applied to respective UEs within the network coverage and the respective UEs are detected not to be served by a network (e.g., E-UTRA) (are detected to be located outside the network coverage).

When the UE 1 and the UE 3 are separated from the network coverage, the second D2D configuration is applied to the UE 1 and the UE 3. Accordingly, the UE 1 and the UE 3 may perform the D2D operation by applying a D2D resource based on the second D2D configuration. If the D2D resource overlaps with a D2D resource used within the network coverage, a D2D operation between the UE 1 and the UE 3 outside the network coverage interferes with a D2D operation by the UE 2 within the network coverage, that is, transmission of a D2D signal by the UE 2.

2) Inefficient Communication in UE Group

It is assumed that the UE 1 and the UE 2 are included in the same group, and perform the D2D operation within the network coverage. Next, it is assumed that only the UE 1 is moved outside the network to change a resource according to the first D2D configuration to a resource according to the second D2D configuration. Further, it is assumed that the UE 2 does not share the second D2D configuration.

In this case, as shown in FIG. 18, there may be parts which do not correspond to each other because the resource according to the first D2D configuration is different from the resource according to the second D2D configuration. If the UE 1 transmits a D2D signal using the parts which do not correspond to each other from the resource according to the second D2D configuration, the UE 2 cannot receive the above signal. Accordingly, loss is generated in the D2D operation between the UE 1 and the UE 2. Since the D2D operation requires high reliability, the loss is not preferable.

Meanwhile, although the above example has illustrated only a scenario where the UE is moved to an outside of the network coverage from an inside of the network coverage, the above problem is not always generated in the above case.

That is, the same problem may occurs in a scenario where the UE is moved to the inside of the network coverage from an outside of the network coverage.

For example, it is assumed that the UE 1 and the UE 2 perform a D2D operation using a D2D configuration (second D2D configuration) shared to each other outside the network coverage and only the UE 1 is moved into the network coverage to suddenly use the first the first D2D configuration. In this case, as a result, D2D configurations which are not shared between the UE 1 and the UE 2 are used. Accordingly, the loss occurs in the D2D operation between the UE 1 and the UE 2.

As illustrated in the above example, when the UE is separated from or enters in the network coverage, change of the D2D configuration without control of the resource causes interference between different UE groups and may cause the loss in the D2D operation between UEs in the same group. Accordingly, there is a need for a D2D operation method capable of solving the above problems and an apparatus thereof.

In order to solve the above problems, the present invention may take into consideration a method of allowing a D2D resource within network coverage according to a first D2D configuration to be the same as or overlap with a D2D resource outside the network coverage according to a second D2D configuration. That is, the present invention may take into consideration a method of coordinating D2D resource information used within the network coverage and D2D resource information used outside the network coverage.

The resource coordination method may have two approaches as follows.

1) approach where UE outside the network coverage depends on resource information within the network coverage, and 2) Approach where UE within the network coverage depends on resource information outside the network coverage.

The second approach allows the network to update system information indicating a D2D resource pool by taking into consideration D2D resource information outside the network coverage or to provide dedicated signaling to the UE for updating the D2D resource information. Such a scheme may not be preferable because signaling overhead is very large. Accordingly, the first approach is preferable.

The easiest implementation method of the first approach is to provide resource pool information thereof to a UE outside the coverage by a UE within the coverage. In this case, the UE within the coverage may broadcast resource pool information thereof If a UE outside the coverage receive resource information from a UE within the coverage, the UE outside the coverage may depend on D2D resource information received from the UE within the coverage which is not the above second D2D configuration. If the UE outside the coverage receives no D2D resource information from the UE within the coverage, the UE outside the coverage may use the second D2D configuration.

Figure 19:
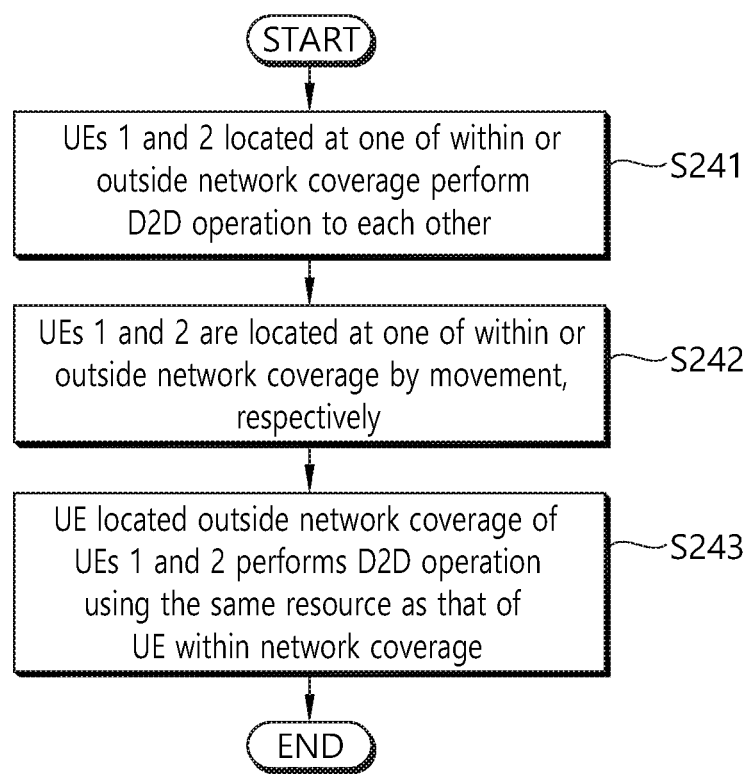
FIG. 19 illustrates a D2D operation method according to an embodiment of the present invention.

FIG. 19 illustrates a D2D operation method according to an embodiment of the present invention.

Referring to FIG. 19, a UE 1 and a UE 2 located at one of within or outside network coverage (hereinafter simply referred to as 'coverage') perform a D2D operation to each other (S241).

The UE 1 and the UE 2 are located at one of within or outside network coverage by movement, respectively (S242).

A UE located outside the network coverage of the UE 1 and the UE 2 performs a D2D operation using the same resource as that of the UE within the network coverage (S243).

For example, both of the UE 1 and the UE 2 are located within the coverage to perform the D2D operation and then the UE 1 is moved outside the coverage and the UE 2 may be located with the coverage. In this case, when the UE 1 receives resource information from the UE 2, the UE 1 configures the D2D resource. If the UE 1 does not receive resource information from the UE 2, the UE 1 configures/uses a D2D resource according a preset second D2D configuration.

Meanwhile, a resource is used to provide the resource information. To unnecessarily provide the resource information becomes resource consumption. If the UE within the coverage may know whether there is a UE outside the coverage performing the D2D operation, the UE may prevent unnecessary resource information from being provided. That is, if there is a UE outside the coverage performing the D2D operation, the UE within the coverage may provide the resource information.

Figure 20:
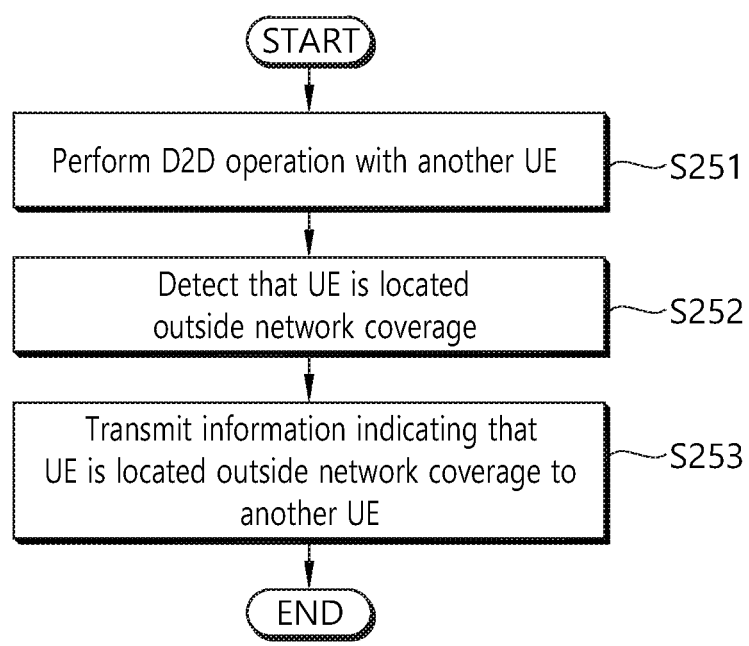
FIG. 20 illustrates an example where a UE detects a coverage relation state to report the coverage relation state to another UE.

FIG. 20 illustrates an example where a UE detects a coverage relation state to report the coverage relation state to another UE.

Referring to FIG. 20, a UE performs a D2D operation with another UE (S251).

The UE may detect that the UE is located outside the network coverage (S252).

The UE transmits information indicating that the UE is located outside the network coverage to another UE (S253).

A following table 4 is an example of information reporting whether the UE is located outside the network coverage.

TABLE 4

```
-- ASN1START
MasterInformationBlock-SL ::=    SEQUENCE {
    sl-Bandwidth-r12                 ENUMERATED {
                                     n6, n15, n25, n50, n75, n100},
    tdd-SubframeAssignment-112       TDD-SubframeAssignmentSC-112,
    directFrameNumber-r12            BIT STRING (SIZE (10)),
    directSubFrameNumber-r12         INTEGER (0..9),
    inCoverage-r12                   BOOLEAN,
    reserved-r12                     BIT STRING (SIZE (27))
}
-- ASN1STOP
```

In the table 4, the 'sl-Bandwidth' is a parameter regarding a transmission band configuration. The n6 represents 6 resource blocks, and the n15 represents 15 resource blocks, which may correspond to the number of resource blocks.

The 'directFrameNumber' indicates a frame number.

The 'inCoverage' represents whether a UE transmitting information of the table 4 is located within a network, for example, an E-UTRAN.

As described above, when the UE detects that the UE is located outside the network coverage, the UE may broadcast information indicating that the UE is located outside the network coverage. The UE may be a UT configured to transmit a synchronization signal. Another UE may know that the UE is located outside the network coverage through information transmitted from the UE to perform a necessary next operation.

FIG. 20 illustrates an example where the UE determines whether the UE is located within network coverage to report the determination result to a neighboring another UE.

Figure 21:
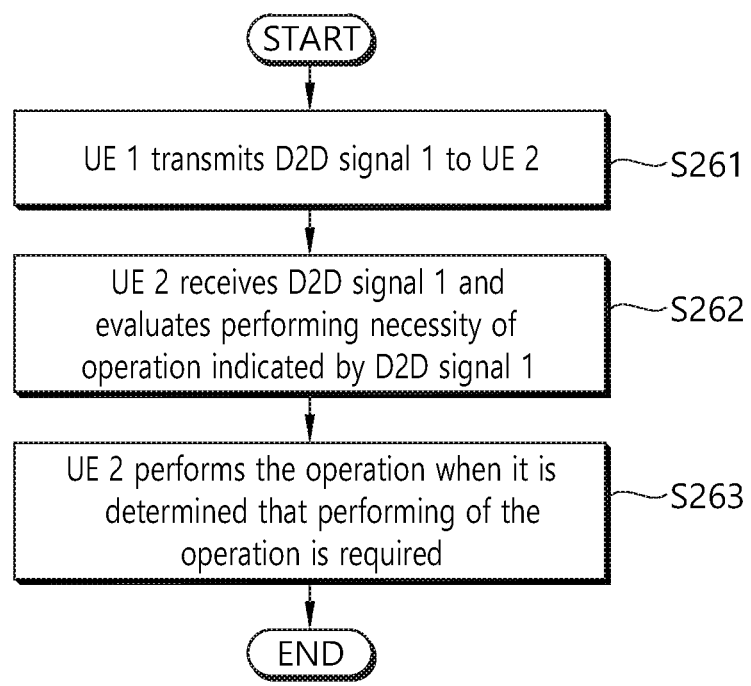
FIG. 21 illustrates a method of detecting a coverage relation state thereof to report the detected coverage relation state to another UE and detecting another UE outside the coverage by the UE.

FIG. 21 illustrates a method of detecting a coverage relation state thereof to report the detected coverage relation state to another UE and detecting another UE outside the coverage by the UE.

It is assumed that a UE 1 is a UE within the coverage.

Referring to FIG. 21, the UE 1 transmits a D2D signal (may refer to a D2D signal 1). The D2D signal 1 may be a signal for inquiring whether there is an UE outside the coverage or a signal for controlling the UE 2 to perform a specific operation (S261). The D2D signal 1 may include information indicating that a UE transmitting the D2D signal 1 is located within network coverage or located outside the network coverage. The D2D signal 1 may include all or a part of a frequency, a band width, an uplink downlink discrimination scheme, a frame number, and a subframe number for the D2D operation, an UE ID of the UE 2, an ID of a group in which the UE 2 is included, an ID of a direct communication cluster in which the EU 2 is included, information indicating a D2D transmission resource, and information indicating a D2D reception resource.

The D2D signal 1 may include a condition where another UE (UE 2) should evaluate based on network coverage and information indicating an operation performed by the UE 2 when the condition is satisfied.

That is, the D2D signal 1 may include information or a condition used to determine whether the UE 2 performs the operation. If the condition is satisfied, the UE 2 may perform an operation indicated by the D2D signal 1.

The condition may include one of following characteristics or a combination of two or more characteristics.

1) UE (UE 2) is located outside network coverage.
2) The UE is located within the network coverage.
3) The UE is not served by an E-UTRA.
4) The UE is served by an E-UTRA.
5) The UE can discover no synchronization signals transmitted from a network.
6) The UE can discover no synchronization signals.
7) The UE can discover no UEs providing a relay function.

A state where the UE is located outside the network coverage may be one of following states.

1) A state where the UE is served from no networks (that is, the UE does not select a suitable cell or an acceptable cell to camp-on with respect to some RAT). 2) A state where the UE is not served by an E-UTRA (that is, the UE does not select a suitable cell or an acceptable cell to camp-on in an E-UTRA). 3) A state where the UE may not discover a cell providing measurement strength or measurement quality greater than a threshold value in a frequency in which the D2D is performed.

The D2D signal 1 may separately the requesting operation and a performing condition of the operation. That is, the requesting operation and the performing condition may be separately indicated. For example, a D2D signal indicating the requesting operation and a D2D signal indicating the performing condition of the operation may be provided, respectively. Alternatively, the requesting operation and the performing condition may be indicated by a field indicating the requesting operation and a field indicating the performing condition of the operation in the same D2D signal.

Alternatively, the requesting operation and the performing condition thereof may be indicated in a combined form. That is, the requesting operation and the performing condition thereof may be indicated through a value of a single field of the D2D signal.

An optional number may be indicated in a specific field of the D2D signal. The optional number may be used as an ID of the D2D signal.

Further, the D2D signal 1 may include information indicating a UE transmitting a D2D signal (may refer to a D2D message 2) as a response. That is, the D2D signal 1 may include an ID indicating a reception subject. The D2D signal 1 may include at least one of a group ID and a UE ID. The group ID and the UE ID may sequentially indicate a UE group or a UE which will receive the D2D signal.

Alternatively, the D2D signal 1 may indicate to transmit a D2D signal as a response if some UE receives the D2D signal without instructing a specific UE.

The D2D signal 1 may indicate an operation for requesting to a UE receiving the signal. For example, when the UE 1 transmits a D2D signal 1 to the UE 2, the D2D signal 1 may request the UE 2 to transmit a response signal.

Meanwhile, various signals (messages) may serve as the D2D signal 1. For example, a D2D discovery signal/message may serve as the D2D signal 1. Alternatively, the D2D communication message may serve as the D2D signal 1. The D2D signal means data transmitted through a channel defined through D2D communication between UEs. A channel defined for D2D communication may be a channel for transmitting/receiving D2D data, a channel for transmitting/receiving transmission relation control information of the D2D data, or general configuration relation control information for a D2D operation.

Alternatively, a D2D synchronization signal may serve as the D2D signal 1. For example, the UE 1 may transmit the synchronization signal as the D2D signal 1. The UE 2 receiving the synchronization signal may transmit a D2D signal 2 as a response. In this case, the UE 1 may adjust synchronization using the synchronization signal. The UE 1 may transmit at only a predetermined period.

The UE 2 receives the D2D signal 1 and evaluates performing necessity of an operation indicated by the D2D signal 1 (S262). As describe above, the D2D signal 1 may include at least one of an operation requesting for the UE 2, a performing condition of the operation, an ID of a reception subject, and an ID of the D2D signal 1.

When it is determined that performing of the operation, the UE 2 performs the operation (S263).

If the UE 2 receives a D2D signal 1 including a group ID as a reception subject, the D2D signal may valid in the UE 2 by allowing a group ID of the UE 2 to be the same as or correspond to a group ID included in the D2D signal 1.

If the group ID of the UE 2 is different from a group ID included in the D2D signal 1, the D2D signal 1 is not valid with respect to the UE 2. Accordingly, the UE 2 disregards the D2D signal and does not perform an operation indicated by the D2D signal 1.

Alternatively, if the UE 2 receives a D2D signal 1 including a UE ID as an ID indicating a reception subject, only when an ID of the UE 2 is the same as the UE ID indicating the reception subject, the D2D signal is valid in the UE 2.

If the UE 2 receives a D2D signal 1 which does not include a group ID or a UE ID indicating a reception subject, the UE 2 may perform an operation requested according to the D2D signal 1 regardless of a group ID or a UE 2 of the UE 2.

Meanwhile, if the D2D signal 1 includes a condition, only when the condition is satisfied, the UE 2 may perform the operation requested according to the D2D signal 1.

If the condition is 'UE (UE 2) is located outside the network coverage', the condition may mean that the UE does not find one of a suitable cell to camp-on or an acceptable cell. Alternatively, an NAS tier of the UE is described. The condition may correspond to an 'EMM-REGISTERED.NO-CELL-AVAILABLE' state or an 'EMM-DEREGISTERED.NO-CELL-AVAILABLE' state. Alternatively, the condition may correspond to a case where the UE finds no cells satisfying the equation 1.

If the condition is 'UE is not served by an E-UTRA', the condition means that the UE does not find one of a suitable cell to camp-on or an acceptable cell.

If the condition is 'UE is located outside the network coverage', the condition means that the UE does not find one of a suitable cell to camp-on or an acceptable cell. If the condition is 'UE is located outside the network coverage', the condition may mean that the UE cannot find a cell for providing measurement strength or measurement quality greater than a threshold value at a frequency in which the D2D is performed.

If one of the above conditions is satisfied, the UE 2 determines that an operation requested according to the D2D signal 1 is required and performs the operation. For example, the operation may be transmission of a response with respect to a received D2D signal 1. In this case, the response may refer to a D2D signal 2 (or D2D message 2) and may include at least one of following information.

1) UE ID of UE 2: The information indicates who transmits the D2D signal 2 to a UE (e.g., UE 1) receiving the D2D signal 2.

2) Group ID of UE 2: The information indicates a group of UEs transmitting the D2D signal 2.

3) Condition indicated by the D2D signal 1: The information indicates that the UE transmits the D2D signal 2 by satisfying a certain condition.

4) Optional number indicated according to the D2D signal 1: The information may indicate which a response of the D2D signal 1 is the D2D signal 2. For example, when an optional number X is included in the D2D signal 1, a D2D signal 2 transmitted as a response with respect to the D2D signal 1 includes the optional number X. Accordingly, the UE may determine whether the response is suitable. Meanwhile, the optional number is not always one number but may be a function of a plurality of parameters. The function may be shared in UEs included in the same group. The UEs in the same group may be commonly used as input of the function by sharing one of a plurality of parameters.

Figure 22:
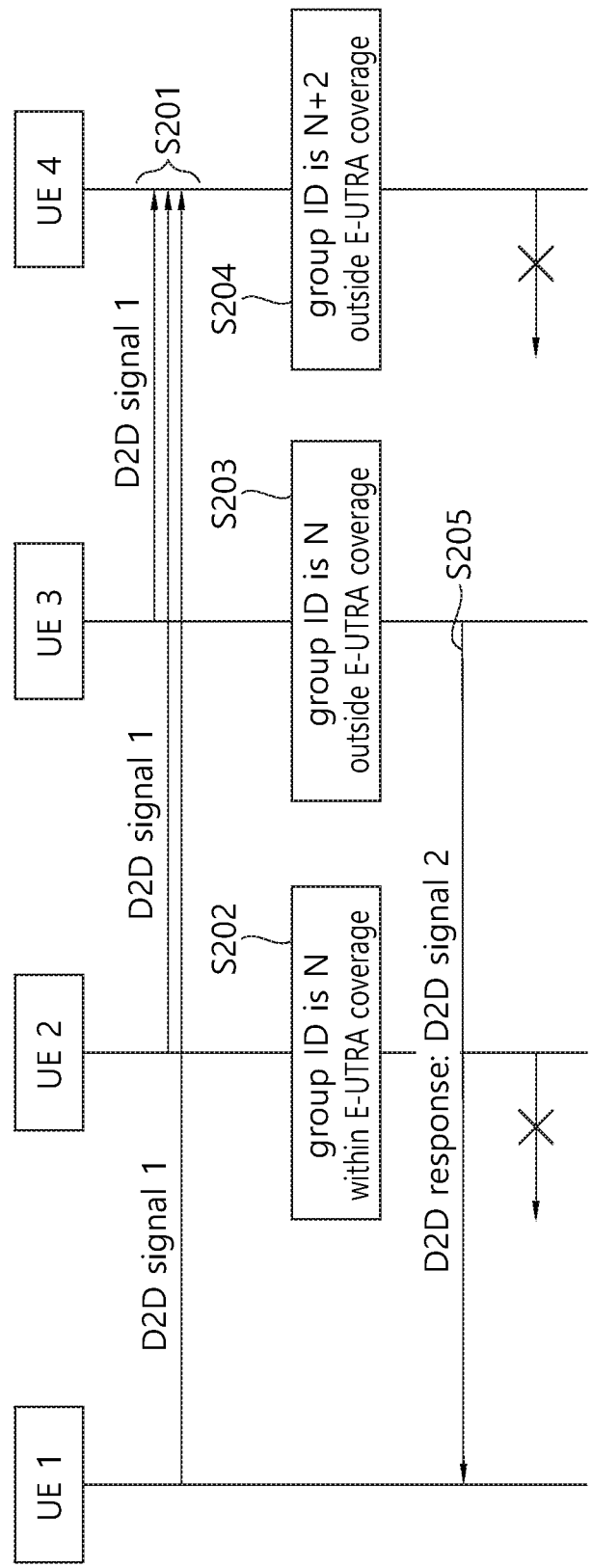
FIG. 22 illustrates a method of detecting another UE located outside the network coverage by the UE.

FIG. 22 illustrates a method of detecting another UE located outside the network coverage by the UE.

Referring to FIG. 22, a UE 1 broadcasts a D2D discovery signal (D2D discovery message) (S201). That is, step S201 is a case where the D2D discovery signal is used as a D2D signal 1 (D2S message 1). UEs 2, 3, and 4 receive the broadcasted D2D signal 1.

The D2D discovery signal may include a group ID indicating a reception subject, information indicating a requesting operation, information indicating performing conditions of the operation, and an ID with respect to the D2D discovery signal.

For example, the D2D discovery signal has N as a group ID indicating a reception subject, information indicting the requesting operation may be given as a D2D response request (that is, transmission request of the D2D signal), information indicating the performing conditions of the operation may be given as 'coverage of an E-UTRA is separated', and an ID with respect to the D2D discovery signal may be given as an optional number M.

If the UE 2 is located within a E-UTRA coverage and the group ID is N (S202), the performing conditions are not satisfied. Accordingly, the UE 2 does not transmit a D2D response to the UE 1.

If the UE 3 is located outside the E-UTRA coverage, and a group ID is N (S203), the UE 3 satisfies the performing conditions. Accordingly, the UE 2 transmits a D2D response (D2D signal 2) to the UE 1 (S205). In this case, in order to identify which response of the D2D signal 1 is the D2D response, the UE 2 may transmit the D2D signal 1 while including an ID of the D2D signal 1. That is, in the above example, the D2D response includes a number M which is an ID with respect to the D2D discovery signal.

If the UE 4 is located outside the E-UTRA coverage, and a group ID is N+2 (S204), the UE 4 does not satisfy the performing conditions. Accordingly, the UE 4 does not transmit a D2D response to the UE 1.

Figure 23:
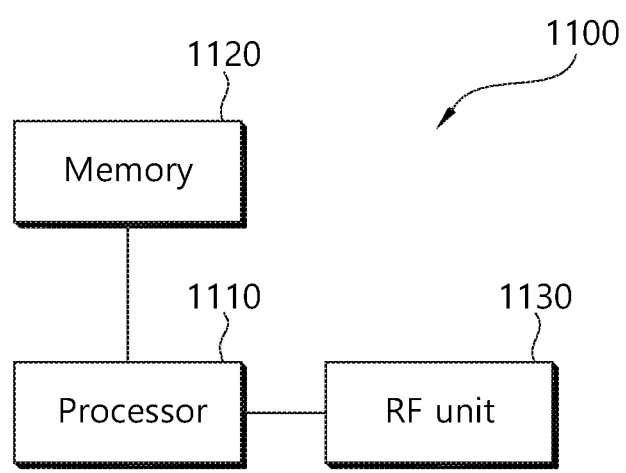
FIG. 23 is a block diagram illustrating a UE according to an embodiment of the present invention.

FIG. 23 is a block diagram illustrating a UE according to an embodiment of the present invention.

Referring to FIG. 23, a UE 1100 includes a processor 1110, a memory 1120, and an RF unit 1130. The processor 1110 performs the proposed functions, processes and/or methods. For example, the processor 1110 transmits a D2D signal 1 to another UE, and receives a D2D signal 1 which is a response with respect to the D2D signal 1. Accordingly, the processor 1110 may recognize whether another UE is located outside the network coverage. If another UE is located outside the network coverage, the processor 1110 may broadcast resource pool information. Accordingly, another UE may the same D2D resource as that of the UE 1100 using resource pool information.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for performing a device-to-device (D2D) operation in a wireless communication system, the method performed by a first user equipment (UE) and comprising:
    receiving, from a second UE, D2D information informing whether the second UE is located within a coverage of a network; and
    performing the D2D operation based on the D2D information,
    wherein the first UE is located out of the coverage of the network, and
    wherein, when the first UE determines that the second UE is located within the coverage of the network based on the D2D information, the first UE performs the D2D operation based on the second UE being a reference for the D2D operation.

2. The method of claim 1, wherein the D2D information is broadcasted.

3. The method of claim 1, wherein the D2D operation includes D2D discovery or D2D communication.

4. A first user equipment (UE) comprising:
    a radio frequency (RF) transceiver that receives and transmits radio signals; and
    a processor connected to the RF transceiver to be operated and that:
        controls the RF transceiver to receive, from a second UE, device-to-device (D2D) information informing whether the second UE is located within a coverage of a network; and
        performs a D2D operation based on the D2D information,
    wherein the first UE is located out of the coverage of the network, and
    wherein, when the first UE determines that the second UE is located within the coverage of the network based on the D2D information, the first UE performs the D2D operation based on the second UE being a reference for the D2D operation.

5. The first UE of claim 4, wherein the D2D information is broadcasted.

6. The first UE of claim 4, wherein the D2D operation includes D2D discovery or D2D communication.

* * * * *